United States Patent

Makarova et al.

[11] 4,271,276
[45] Jun. 2, 1981

[54] METHOD FOR PREPARING CROSS-LINKED VINYLAROMATIC POLYMERS CONTAINING NITRO GROUPS

[76] Inventors: Serafima B. Makarova, Leningradsky prospekt, 57, kv. 117; Jury A. Leikin, ulitsa Grishina, 8, kv. 103; Anatoly V. Smirnov, Zelenodolskaya ulitsa, 32, korpus 2, kv. 7, all of Moscow; Valery Y. Semeny, ulitsa Navoi, 57, kv. 27, Kiev; Eleonora M. Pakhomova, ulitsa Volgina, 25, korpus 2, kv. 10, Moscow; Galina I. Korelskaya, ulitsa Polbina, 60, kv. 206, Moscow; Antonin P. Polikarpova, Volzhsky bulvar, 36, kv. 17, Moscow; Andrei A. Ilinsky, Botanicheskaya ulitsa, 27, kv. 7, Moscow; Olga N. Vlasovskaya, Profsojuznaya ulitsa, 100, korpus 4, kv. 24, Moscow; Ljudmila A. Tikhonova, Domodedovskaya ulitsa, 11, korpus 1, kv. 191, Moscow, all of U.S.S.R.

[21] Appl. No.: 772,473

[22] Filed: Feb. 28, 1977

[51] Int. Cl.$^3$ .................................................. C08F 8/30
[52] U.S. Cl. ............................... 525/340; 525/327; 525/336; 525/344; 525/367
[58] Field of Search .................. 526/14, 23, 27, 41, 526/52, 47; 525/327, 336, 340, 344, 354, 360, 377, 367

[56] References Cited

PUBLICATIONS

Lenz, *Organic Chemistry of Synthetic High Polymers*, Interscience Publishers, (1967), pp. 688, 689.
Fettes, [Chemical Reactions of Polymers, Interscience Publishers, (1964), pp. 1, 2.
Groggins, P. H., Unit Processes in Organic Synthesis, McGraw-Hill, (N. Y.), 1952, pp. 23, 24, 2, 4.
Chem. Abst., 64, 12890(h), 1966.

Primary Examiner—C. A. Henderson
Attorney, Agent, or Firm—Lackenbach, Lilling & Siegel

[57] ABSTRACT

The method for preparing cross-linked vinylaromatic polymers containing nitro groups having the general formula

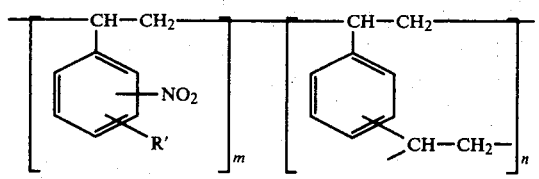

where R' is H, $NO_2$, COOH, $SO_3H$, $P(O)(OH)_2$, or $P(O)H(OH)$, m is from 60 to 99 and n is from 40 to 1, consists in treatment of the starting cross-linked polymers having the general formula

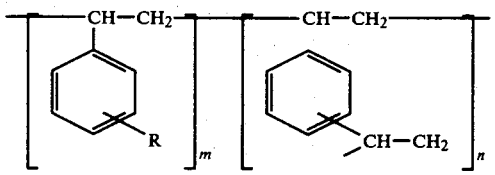

where R is H, COOH, $SO_3H$, $P(O)(OH)_2$, or $P(O)(OH)$, m is from 60 to 99 and n is from 40 to 1, with a mixture of an alkali metal nitrate and an acid agent, at a temperature from $-5°$ to $95°$ C. The quantity of the alkali metal nitrate in the nitrating mixture is from 0.1 to 8 moles per mole of the starting cross-linked polymer.

The method provides conditions for preparing cross-linked vinylaromatic polymers, containing nitro groups, having higher mechanical strength, high osmotic stability, and their volume in an ion-exchange column changes insignificantly as acid media are changed for alkaline, and vice versa.

6 Claims, No Drawings

METHOD FOR PREPARING CROSS-LINKED VINYLAROMATIC POLYMERS CONTAINING NITRO GROUPS

BACKGROUND OF THE INVENTION

This invention relates to methods for preparing cross-linked vinylaromatic polymers containing nitro groups and having selectively with respect to cations of polyvalent and alkali metals.

Cross-linked vinylaromatic polymers containing nitro groups are used as carriers in liquid and gas-liquid chromatography, as sorbents (cation-exchangers) in chemical analysis and for separation of cations of polyvalent metals from alkali metals, for separation of mixtures of alkali metals, for purification of salt solutions of polyvalent metals from microadmixtures of other polyvalent metals, and also as catalysts in the manufacture of organic compounds.

Known in the art are methods for preparing various cross-linked vinylaromatic polymers containing nitro groups.

Common for all known methods is nitration of a polymer with a nitrating mixture containing concentrated nitric acid. Depending on the nature of the starting textured vinylaromatic polymer, the nitrating mixture consists either of concentrated nitric acid alone, or its mixture with concentrated sulphuric acid taken in various proportions.

For example, styrene divinylbenzene polymer containing phosphonic and nitro groups, is prepared in one case by nitration with a mixture of concentrated nitric and sulphuric acids and in another case by nitration with concentrated sulphuric and nitric acid, or concentrated nitric and acetic acids. The sytrene divinylbenzene polymer containing sulpho and nitro groups was prepared also in two cases by treating textured sulpho polystyrene with a mixture of concentrated nitric and sulphuric acids, and in one case by treating with concentrated nitric acid alone.

Known also is a method for preparing styrene divinylbenzene polymer containing carboxyl and nitro groups by nitration of carboxy styrene divinylbenzene cation-exchanger with concentrated nitric acid in the presence of potassium nitrate (Z.Chem. 1968, 8, (1) 26–27), and styrene divinylbenzene polymer containing only nitro groups, by treating the copolymer of styrene and divinylbenzene with a mixture of concentrated nitric and sulphuric acids (Methods for Preparing Chemical Reagents and Preparations', Moscow, IRFA, 9, 1964, 17).

The disadvantage inherent in all these methods is nitration in very strict conditions, which is especially vivid in the case with concentrated nitric acid (rather than with sulphuric acid). The result of these exacting requirements is low chemical stability of the polymers containing nitro groups, in alkali medium in particular, and also appreciable dephosphorylation, desulphonation, and decarboxylation of polymers containing functional groups during their nitration. The strict conditions make it practically impossible to obtain polymers with small amount of cross-linkages suitable for use in chromatographic columns. For example, 1 g of sulpho cation-exchanger containing 2 percent of divinylbenzene, after treatment with a mixture of concentrated nitric and sulphuric acids, occupies a volume of about 60 ml. As it is converted into the Na-form with a 4 percent NaOH solution, the specific volume is reduced to 5–6 mg/g, which makes it impossible to use the material in ion-exchange columns.

During preparation of cross-linked polymers containing phosphonic and nitro groups, and also carboxyl and nitro groups, or nitro groups alone, by the known methods, this disadvantage works and makes the polymers hardly applicable for use in ion-exchange columns. In nitration by the known methods it is impossible to prevent oxidation of phosphinic groups [—P(O)H(OH)] to phosphonic [—P(O)(OH)$_2$].

Furthermore, the processes utilizing concentrated nitric acid are fraught with danger of explosion and fire, and cause heavy corrosion in the process equipment.

The object of this invention is to improve the process conditions.

Another object of the invention is to rule out concentrated nitric acid from the process.

SUMMARY OF THE INVENTION

In accordance with these and other objects, the invention consists in the method for preparing cross-linked vinylaromatic polymers, containing nitro groups, having the general formula

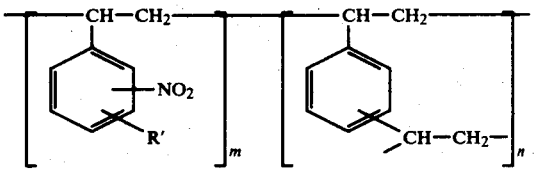

where R' is H, NO$_2$, COOH, SO$_3$H, PO(OH)$_2$, or P(O)H(OH), m is 60–99, and n is 40–1, in which, according to the invention, the starting polymers having the general formula

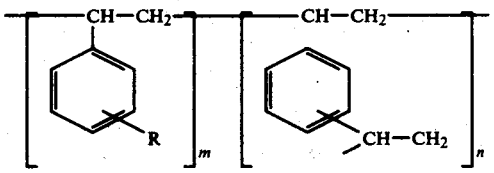

where R is H, COOH, SO$_3$H, P(O)(OH)$_2$, or P(O)H(OH), m is 60–99, and n is 40–1, are treated, at a temperature of from −5 to 95° C., with a mixture of alkali metal nitrate and sulphuric acid, polyphosphoric acid, glacial acetic acid, or acetic anhydride, the nitrate of the alkali metal being taken in the quantity of from 0.1 to 8 moles per mole of the starting cross-linked polymer.

DESCRIPTION OF THE PREFERRED EMBODIMENTS

In order to introduce nitro groups into the starting polymer, and also to preserve the P(O)H(OH) group, it is recommended to treat the starting polymers at a temperature from −5° to 20° C.

In order to introduce nitro and sulpho groups, the starting polymers should be treated at a temperature of 60°–80° C.

In order to introduce nitro group, it is recommended to take the alkali metal nitrate in the quantity of from 1 to 8 moles per mole of the starting cross-linked polymer, and to introduce sulpho and nitro groups, the nizrate should be taken in the quantity of 0.1–0.6 mole per mole of the starting cross-linked polymer.

The method for preparing cross-linked vinylaromatic polymers containing nitro groups is realized as follows.

The starting cross-linked polymer, e.g. copolymers of styrene and divinylbenzene, of both gel and porous structure, is loaded into a reactor, a solvent is added, the material is swollen within 30–60 minutes, and then a mixture of alkali metal nitrate and acid is added.

Polymers of other vinylaromatic monomers, such as acenaphthylene, vinylnaphthalene, vinyltoluene, can be used as the starting cross-linked vinylaromatic polymers as well.

Depending on the object, the reaction mixture is heated or cooled, and kept for 4–6 hours to complete the reaction.

Chlorinated hydrocarbons, such as dichloroethane or tetrachloroethane, that are stable to the process conditions according to the invention, can be used as solvents.

The nitrates of alkali metals according to the invention are mainly sodium nitrate and potassium nitrate, the most readily available compounds of this class.

The quantity of the alkali metal nitrate in the mixture depends on the type of the wanted nitro polymer and varies within the range of 0.1–8 moles per mole of the starting cross-linked polymer. If nitro and sulpho groups are to be introduced into the polymer, the quantity of the nitrate should be from 0.1 to 0.6 mole per mole of the starting polymer, and if nitro group alone is wanted, the nitrate concentration range should be within 1–8 moles. The total quantity of the mixture that should be added to the starting cross-linked polymer depends on the degree to which it can be swollen and should be sufficient for its uniform treatment.

Sulphuric acid, polyphosphoric acid, or acetic acid can be used as the acid constituent in the nitrate mixture. Acetic anhydride can be used instead of acetic acid, which is practically the same. If cross-linked polymers containing both nitro and sulpho groups are wanted, concentrated sulphuric acid can only be used as the acid agent.

To prepare cross-linked polymers containing nitro groups, the nitration process should predominantly take place, which requires the process temperature to be within the range from −5° to 95° C. (mainly from 0° to 20° C.); if the sulphonation and nitration processes occur simultaneously the process temperature should be from 60° to 80° C.

The advantages of the proposed method are the possibility of preparing cross-linked vinylaromatic polymers, containing nitro groups, having higher mechanical strength, high osmotic stability, and insignificantly changing their volume inside a column as the acid medium is changed for alkaline, and vice versa.

The specific volume of H-from a cation-exchanger containing nitro and sulpho groups obtained according to the invention is from 6 to 10 ml/g, and when converted into the Na-form with a 0.1 N NaOH solution, it is from 4.5 to 7.5 ml/g.

The specific volumes of cation-exchangers containing phosphonic and nitro groups, obtained by the proposed method, are twice as less compared with cation-exchangers obtained by the known methods.

Moreover, in the process according to the invention, it is possible to preserve, in the structure of the starting polymer, phosphinic groups, that are specific and have physical and chemical properties different from those of phosphonic groups.

Another advantage of the proposed method is also simplification and improvement of the process conditions, in which corrosion of the equipment, and also the danger of explosion and fire are eliminated.

For a better understanding of the invention, the following examples of its practical embodiment are given by way of illustration.

EXAMPLE 1

Place 25 g of copolymer of styrene with 2 mol.% of p-divinylbenzene into a three-neck flask provided with a stirrer, thermometer and a reflux condenser, add 75 ml of dichloroethane and keep for 30–60 minutes. Now load a suspension of 500 ml of concentrated sulphuric acid and 11.3 g of potassium nitrate and stir for four hours at a temperature of 60° C. Cool the mixture, separate sulphuric acid and dichloroethane by filtration, and add the product gradually into distilled water with stirring. Wash the cation exchanger with water to neutral reaction, treat with a 4 percent NaOH solution and wash again to neutral reaction. To convert the cation-exchanger into the H-form, treat with a 6 percent hydrochloric acid, wash with distilled water until the washings react neutral, and dry at a temperature of 60° for 6 to 8 hours. The capacity of the product with respect to 0.1 N NaOH is 3.1 meq/g., the specific volume of the H-form is 8.1 ml/g, the content of N and S is 4.5 and 9.5 percent by weight respectively.

EXAMPLE 2

Treat 25 g of copolymer of styrene with 2 mole percent of p-divinylbenzene as instructed in Example 1, except that the reaction mixture should contain 5 g of potassium nitrate (0.2 mole per mole of the copolymer). The process temperature is 80° C.

The capacity of the ion-exchanger is 4.0 meq/g., the specific volume is 9.8 ml/g, the content of N and S is 1.6 and 12.6 percent by weight respectively.

EXAMPLE 3

Treat 10 g of phosphonic cation exchanger (containing 5 mole percent of divinylbenzene, having the exchange capacity of 8.5 meq/g with respect to a 0.1 N NaOH solution) with a mixture of 50 g of sodium nitrate and 70 ml of concentrated sulphuric acid. Keep the reaction mixture for 4 hours at room temperature and discharge in water by portions. Further proceed as in Example 1.

The content of N in the cation-exchanger is 6.1 percent by weight, the ion-exchange capacity is 7.0 meq/g with respect to 0.1 N NaOH solution, the swelling coefficient is 3.5 ml/ml.

EXAMPLE 4

Treat 10 g of cation-exchanger, as instructed in Example 3 but use only 2 g of sodium nitrate per gram of the starting cation-exchanger. The nitrogen content of the obtained cation-exchanger is 5.3 percent by weight, the ion-exchange capacity (0.1 N NaOH solution) is 7.2 meq/g, the swelling coefficient 3.0 ml/ml.

EXAMPLE 5

Treat porous copolymer of styrene with 20 mole percent of divinylbenzene, obtained in the presence of 80 percent by weight of octane, with phosphorus trichloride in the presence of anhydrous $AlCl_3$ for 8 hours at a temperature of 75° C. with subsequent hydrolysis by water. The phosphinic cation-exchanger contains 12.8 percent by weight of P and has and ion-exchange capacity of 4.2 meq/g (NaOH). Treat 5 g of the obtained cation-exchanger with a nitrating mixture consisting of 10 g of $KNO_3$ and 50 ml of 96 percent sulphuric acid at a temperature of 0° C. for 24 hours, then filter, and treat subsequently with water, 5 percent NaOH solution, water, 5 percent HCl, and finally with water again. The nitrogen content is 6.9 percent by weight, phosphorus content 9.9 percent by weight. The ion-exchange capacity, with respect to NaOH, is 5.5 meq/g (tervalent phosphorus content, with respect to the total phosphorus, is 52 percent).

EXAMPLE 6

Treat 1 g of phosphinic cation-exchanger with a nitrating mixture consisting of 1.4 g of $KNO_3$ and 30 ml of polyphosphoric acid at a temperature of 95° C. for 10 hours. Then proceed as instructed in Example 1. The product contains 3.9 percent by weight of nitrogen, and 10.8 percent by weight of phosphorus. The ion-exchange capacity is 6.5 meq/g with respect to NaOH.

EXAMPLE 7

Treat 10 g of carboxyl cation-exchanger on the basis of styrene copolymer with divinylbenzene, having a porous structure and and ion-exchange capacity of 5.5 meq/g, as instructed in Example 4. The obtained cation-exchanger contains 4.2 percent by weight of nitrogen and its ion-exchange capacity is 4.5 meq/g.

EXAMPLE 8

Swell 2.8 kg of styrene copolymer with 40 mol. percent of divinylbenzene, obtained in the presence of 100 percent by weight of isooctane, in 9 liters of dichloroethane, add a mixture of 2.0 kg of $KNO_3$ and 5 liters of concentrated sulphuric acid, and keep for six hours at a temperature of $-5°$ to 0° C. Proceed as in Example 1. The obtained textured nitro polymer contains 5.4 percent by weight of nitrogen.

EXAMPLE 9

Swell 10 g of styrene copolymer with 5 mol. percent of p-divinylbenzene in dichloroethane and treat with a mixture of 20 g of $NaNO_3$ and 80 ml of acetic anhydride for 4 hours at a temperature of 50° C. The obtained textured nitro polymer contains 4.6 percent by weight of nitrogen.

EXAMPLE 10

Treat 5 g of the copolymer specified in Example 8 with a mixture of 3.5 g of $KNO_3$ and 40 ml of concentrated $H_2SO_4$ for 4 hours at a temperature of 60° C. Proceed as in Example 1. The obtained product contains 2.2 percent by weight of nitrogen and 6.0 percent by weight of sulphur. The ion-exchange capacity is 1.8 meq/g (with respect to NaOH).

EXAMPLE 11

Treat 10 g of sulphonic cation-exchanger (having and ion-exchange capacity of 4.5 meq/g with respect to NaOH), on the basis of porous styrene copolymer, with 10 mol. percent of divinylbenzene, obtained in the presence of 100 percent by weight of isooctane, with a mixture of 20 g of potassium nitrate and 60 ml of concentrated sulphuric acid for 4 hours at a temperature of from 0° to 10° C. Further proceed as in Example 1. The ion-exchange capacity of the obtained product, with respect to NaOH, is 3.5 meq/g. The content of nitrogen is 2.8 percent by weight.

What is claimed is:

1. A method for preparing cross-linked vinylaromatic polymers containing nitro groups having the general formula

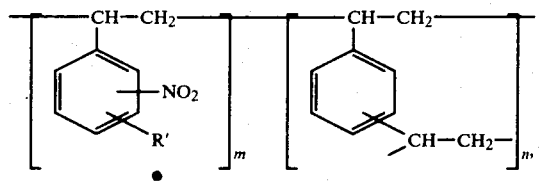

where R' is selected from the group consisting of H, $NO_2$, COOH, $SO_3H$, $P(O)(OH)_2$, $P(O)H(OH)$, m is from 60 to 99, and n is from 40 to 1, consisting in that the cross-linked polymers having the general formula

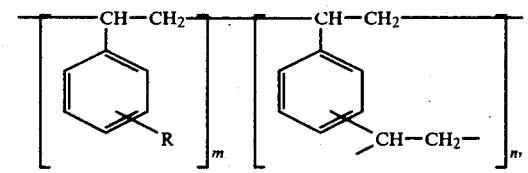

where R is selected from the group consisting of H, COOH, $SO_3H$, $P(O)(OH)_2$ and $P(O)H(OH)$, m is from 60 to 99 and n is from 40 to 1, are treated, at a temperature of from $-5°$ to 95° C., with a mixture of an alkali metal nitrate and an acid agent selected from the group consisting of sulphuric acid, polyphosphoric acid, glacial acetic acid, and acetic anhydride, the alkali metal nitrate being taken in the quantity from 0.1 to 8 moles per mole of the starting cross-linked polymer.

2. A method according to claim 1, in which the starting cross-linked polymers are treated at a temperature from $-5°$ to 20° C.

3. A method according to claim 1, in which the starting cross-linked polymers are treated at a temperature from 60° to 80° C.

4. A method according to claim 1, in which the alkali metal nitrate is taken in the quantity from 1 to 8 moles per mole of the starting cross-linked polymer.

5. A method according to claim 1, in which the alkali metal nitrate is taken in the quantity from 0.1 to 0.6 moles per mole of the starting cross-linked polymer.

6. A method as claimed in claim 1, wherein R' is selected from the group consisting of $SO_3H$, $P(O)(OH)_2$, $P(O)H(OH)$, and COOH.

* * * * *